(12) United States Patent
Høier et al.

(10) Patent No.: US 9,194,215 B2
(45) Date of Patent: Nov. 24, 2015

(54) METHODS FOR STORING CARBON DIOXIDE COMPOSITIONS IN SUBTERRANEAN GEOLOGICAL FORMATIONS

(75) Inventors: Lars Høier, Stavanger (NO); Bamshad Nazarian, Stavanger (NO)

(73) Assignee: STATOIL ASA, Stavanger (NO)

( * ) Notice: Subject to any disclaimer, the term of this patent is extended or adjusted under 35 U.S.C. 154(b) by 0 days.

(21) Appl. No.: 13/876,764

(22) PCT Filed: Sep. 28, 2011

(86) PCT No.: PCT/EP2011/066919
§ 371 (c)(1),
(2), (4) Date: Jun. 13, 2013

(87) PCT Pub. No.: WO2012/041926
PCT Pub. Date: Apr. 5, 2012

(65) Prior Publication Data
US 2013/0259575 A1    Oct. 3, 2013

(30) Foreign Application Priority Data

Sep. 29, 2010    (NO) .................................... 20101350

(51) Int. Cl.
*E21B 41/00*    (2006.01)
*E21B 43/16*    (2006.01)

(52) U.S. Cl.
CPC ........... *E21B 41/005* (2013.01); *E21B 41/0064* (2013.01); *E21B 43/164* (2013.01); *Y02C 10/14* (2013.01)

(58) Field of Classification Search
CPC .................................................. E21B 41/0064
See application file for complete search history.

(56) References Cited

U.S. PATENT DOCUMENTS 3,811,503 A *   5/1974   Burnett et al. ............. 166/252.1
4,609,043 A      9/1986   Cullick (Continued)

FOREIGN PATENT DOCUMENTS

CN    101446189    6/2009
EP    1258595      11/2002

(Continued)

OTHER PUBLICATIONS

McPherson et al., "Two equations of state assembled for basic analyses of multiphase CO2 flow and in deep sedimentary basin conditions," Computers and Geosciences (2008) 34:427-444.

(Continued)

*Primary Examiner* — John Kreck
(74) *Attorney, Agent, or Firm* — Volpe and Koenig, P.C.

(57) ABSTRACT

A method and arrangement are proposed for introducing a $CO_2$ composition into a subterranean geological formation for storage of $CO_2$ therein. The $CO_2$ composition is initially injected into the formation using a first set of injection parameters at which the $CO_2$ composition is a supercritical fluid having first viscosity and density values. The injection parameters are then modified such that the $CO_2$ composition is injected into the formation using at least one second set of injection parameters at which the $CO_2$ composition is a supercritical fluid having second viscosity and density values that are different from said first viscosity and density values, wherein said injection parameters include the injection temperature, injection pressure and hydrocarbon content of the $CO_2$ composition.

9 Claims, 4 Drawing Sheets

(56) References Cited

U.S. PATENT DOCUMENTS

| | | | |
|---|---|---|---|
| 4,800,957 A | 1/1989 | Stevens, Jr. et al. | |
| 4,852,651 A | 8/1989 | Davis | |
| 5,413,177 A | 5/1995 | Horton | |
| 6,347,675 B1 | 2/2002 | Kolle | |
| 6,412,559 B1 * | 7/2002 | Gunter et al. | 166/271 |
| 8,684,085 B2 * | 4/2014 | Kameyama et al. | 166/309 |
| 2002/0041807 A1 * | 4/2002 | Forthuber et al. | 417/22 |
| 2007/0261844 A1 * | 11/2007 | Cogliandro et al. | 166/248 |
| 2008/0283247 A1 | 11/2008 | Zubrin et al. | |
| 2009/0025022 A1 | 1/2009 | Blatchley et al. | |
| 2009/0250224 A1 | 10/2009 | Wright et al. | |
| 2010/0116511 A1 * | 5/2010 | Ramakrishnan et al. | 166/400 |
| 2010/0163225 A1 * | 7/2010 | Abad et al. | 166/263 |

FOREIGN PATENT DOCUMENTS

| | | |
|---|---|---|
| EP | 2233690 | 9/2010 |
| EP | 2314373 | 4/2011 |
| WO | 2009094285 | 7/2009 |
| WO | 2010024949 | 3/2010 |
| WO | 2010102385 | 9/2010 |
| WO | 2010109340 | 9/2010 |

OTHER PUBLICATIONS

Battiistelli et al., "TMGAS: A new TOUGH2 EOS module for the merical smulation of gas mixture injection in geological structures," International Journal of Greenhouse Gas Control (2009) 3:481-493.

Sasaki et al., "Numerical simulation of supercritical CO2 injection into subsurface rock masses," Energy Conversion and Management (2008) 49:54-61.

Norwegian Search Report Application No. 20101350.

Singh et al., "Reservoir Modeling of CO2 Plume Behavior Calibrated Against Monitoring Data From Sleipner, Norway," SPE Annual Technical Conference and Exhibition, Florence, Italy, Sep. 19-22, 2010 (19 pages).

* cited by examiner

METHODS FOR STORING CARBON DIOXIDE COMPOSITIONS IN SUBTERRANEAN GEOLOGICAL FORMATIONS

This application is a 35 U.S.C. §371 national stage application of PCT/EP2011/066919, which was filed Sep. 28, 2011 and is incorporated herein by reference as if fully set forth.

The invention relates to methods for introducing carbon dioxide ($CO_2$) into subterranean geological formations for the permanent storage therein.

BACKGROUND OF THE INVENTION

The increase of $CO_2$ in the atmosphere is thought to have a major influence on global climate. It is therefore desirable that the emission of anthropogenic $CO_2$ into the atmosphere is reduced. The capture and storage of $CO_2$ provides a way to avoid emitting $CO_2$ into the atmosphere, by capturing $CO_2$ from sources such as oil and natural gas processing plants and power plants, transporting it and injecting it into deep rock formations. At depths below about 800-1000 m, $CO_2$ is in a supercritical state that provides potential for efficient utilization of underground storage space. It is considered likely that injecting $CO_2$ into deep geological formations at carefully selected sites will enable storage for long periods of time with a predicted 99% of the $CO_2$ being retained for 1000 years. $CO_2$ can remain trapped underground by virtue of a number of mechanisms, including trapping below an impermeable, confining layer (caprock), retention as an immobile phase trapped in the pore spaces of the storage formation, dissolution in in situ formation fluids, absorption onto organic matter in coal and shale and by reacting with minerals in the storage formation and caprock to carbonate materials. Suitable fields for long-term storage include depleted oil and gas reservoirs, saline formations, which are deep underground porous reservoir rocks saturated with brine and possibly coal formations.

An extensive review of existing $CO_2$ Capture and Storage (CCS) projects and technology is given in the IPCC Special report on Carbon Dioxide Capture and Storage (CCS) ("Carbon Dioxide Capture and Storage", IPCC, 2005, editors: Metz et al., Cambridge University Press, UK; also available at: http://www.ipcc.ch). The paper SPE 127096 "An overview of active large-scale $CO_2$ storage projects", I. Wright et al. presented at the 2009 SPE International Conference on $CO_2$ capture, Storage and Utilization held in San Diego, Calif., USA 2-4 Nov. 2009 provides a more recent update on existing large-scale $CO_2$ storage projects. Of the commercial scale projects reviewed in these documents, the most significant in terms of cumulative volume injected are the Sleipner and In Salah projects.

US 20100116511 A1 discloses a method for permanent storage of $CO_2$ compositions in a subterranean geological formation, where the conditions are continuously adapted such that the composition is injected in supercritical state. Said document also describes an arrangement for injection of $CO_2$ in the formation, which consists of a conduit having an injection port and means for control of the injection parameters with the possibility of changing the parameters.

The Sleipner CGS Project is located 250 km off the Norwegian coast and is operated by StatoilHydro. The $CO_2$ is stored in supercritical state in the Utsira formation at a depth of 800-1000 m below the sea surface. $CO_2$ produced during natural gas processing is captured and subsequently injected underground. $CO_2$ injection started in October 1996 and by 2008, more than ten million tons of $CO_2$ had been injected at a rate of approximately 2700 tons per day. A shallow long-reach well is used to take the $CO_2$ 2.4 km away from the producing wells and platform area. The injection site is placed beneath a local dome of the top Utsira formation.

The In Salah CCS Project is an onshore project for the production of natural gas located in the Algerian Central Sahara. The Krechba Field produces natural gas containing up to 10% of $CO_2$ from a number of geological reservoirs. $CO_2$ is stripped from the gas and re-injected into a sandstone reservoir at a depth of 1800 m enabling the storage of 1.2 Mt of $CO_2$ per year.

While the global capacity to store $CO_2$ deep underground is believed to be large, the opening of a new storage site is inevitably costly as it requires an assessment of potential risk to humans and the ecosystem. It is thus desirable that existing sites are exploited to maximum capacity. Yet current estimates suggest that the existing mechanisms used to inject supercritical $CO_2$ into deep storage sites result in only around 2% of the pore volume of the geological storage site being utilized for $CO_2$ sequestration. This is believed to be due to the uneven sweep of the injected $CO_2$ in subterranean formations, which leads to a phenomenon called "fingering" in which the $CO_2$ injection front is highly uneven with small areas of high penetration surrounded by areas in which the $CO_2$ has not penetrated at all. Pursuing current practices will result in the loss of considerable storage volume in available storage sites.

In view of this state of the art it is an object of the present invention to provide an improved method for the permanent storage of $CO_2$ in subterranean geological formations.

It is a further object of the present invention to provide methods which allow for a more efficient use of the storage capacity of geological formations, for permanent storage of $CO_2$.

SUMMARY OF THE INVENTION

The scope of the invention is defined by the appended independent claims. Preferred embodiments of the invention are defined by the dependent claims.

The invention relates to a method of introducing a $CO_2$ composition into a subterranean geological formation for storage of $CO_2$ therein, the method comprising the steps of: injecting the $CO_2$ composition into the formation using a first set of injection parameters at which said $CO_2$ composition is a supercritical fluid having a first viscosity and density, modifying the injection parameters such that the $CO_2$ composition is injected into the formation using at least one second set of injection parameters at which said $CO_2$ composition is a supercritical fluid having a second viscosity and density that is different from the first viscosity and density, wherein the injection parameters include the injection temperature, injection pressure and hydrocarbon content of the $CO_2$ composition.

By purposefully altering the injection parameters while injecting the $CO_2$ composition into the formation, the viscosity and density and thus the flow behaviour of the $CO_2$ composition at the point where it is injected into the formation can be changed, for example, from a more gas-like flow to a more liquid-like flow or vice versa. The result is a stabilized injection front which provides improved reservoir sweep by reducing the so-called "fingering phenomenon", i.e., by minimizing the size of by-passed areas in the formation. It is estimated that capacity of the geological storage will be significantly higher than with conventional storage techniques. Thus, more efficient use of the reservoir capacity can be made and the total cost of $CO_2$ capture and storage will be reduced.

The period over which $CO_2$ is injected into a reservoir can encompass several decades, depending on the capacity of the particular subterranean formation. In order to maintain a stable injection front over this period, it is preferable to alternate cyclically between the first and second set of injection parameters to obtain a cyclical property change at the site of injection. Within any one injection cycle, i.e. the time interval between commencing injection using the first set of injection parameters, switching to the second set of injection parameters and recommencing injection with the first set of injection parameters, the period of time in which said $CO_2$ composition is injected into said formation under said first set of injection parameters may be substantially equal to the period of time in which said $CO_2$ composition is injected into said formation under said second set of injection parameters or longer or shorter than this latter time period. Hence, an injection cycle may comprise the injection of the $CO_2$ composition at a higher viscosity and density, i.e. in a liquid-like phase for two months followed by injection of the $CO_2$ composition at a lower viscosity and density, i.e. in a gas-like phase for one month, or the injection at each of the different phases for two months each.

In accordance with a first preferred embodiment of the present invention, the first and second injection parameters differ from one another in the injection temperature of the $CO_2$ composition. Altering the temperature of the $CO_2$ composition means that the composition, while still a supercritical fluid at the injection site, has a different viscosity and density and hence behaves differently. In particular, the flow characteristics of the $CO_2$ composition will be altered, enabling different area of the subterranean formation to be filled. Preferably, the temperature of the $CO_2$ composition is set and altered either at the well-head of the injection well or upstream of this, for example at the processing plant at which the $CO_2$ composition is captured. In either case, the temperature is set such that the required viscosity/density of the $CO_2$ composition is obtained at the site of injection.

In accordance with a second preferred embodiment of the present invention, the first and second injection parameters differ from one another in the injection pressure of the $CO_2$ composition. In a similar manner to modifying the injection temperature, modifying the injection pressure results in a change of viscosity and density of the supercritical fluid, in a sense creating a different supercritical "phase". The pressure of the $CO_2$ composition is preferably altered in the processing plant upstream of the well.

In accordance with a third preferred embodiment of the present invention, the first and second injection parameters differ from one another by the hydrocarbon content of the $CO_2$ composition. The purposeful enrichment of the $CO_2$ composition with hydrocarbons, preferably lower alkanes, and more preferably one or more of methane, ethane, propane and butane, similarly alters the viscosity and density of the $CO_2$ composition at the site of injection. In other words, a $CO_2$ composition can be altered to have a higher or lower critical temperature and pressure by the addition of a defined concentration of one or more hydrocarbons, such as those defined above. This shift in the critical properties means that at the same injection temperature and pressure, the hydrocarbon-enriched composition will have a different viscosity/density to that of the non-enriched composition.

Preferably, the hydrocarbon content in the $CO_2$ composition is in the range of 1 mol % hydrocarbon to 15 mol % hydrocarbon, more preferably 2 mol % hydrocarbon to 7 mol % hydrocarbon and most preferably 2 mol % hydrocarbon to 3 mol % hydrocarbon.

The invention also relates to an arrangement for introducing a $CO_2$ composition into a subterranean geological formation comprising: a conduit comprising an injection port having one or more openings (14a-14z), property controlling means for controlling injection parameters of the $CO_2$ composition, the injection parameters consisting of the temperature, pressure and hydrocarbon content of the $CO_2$ composition at the site of injection, wherein the property controlling means are adapted to change the injection parameters from a first set of injection parameters, at which the injected $CO_2$ composition has first viscosity and density values, to a second set of parameters, at which the injected $CO_2$ composition has second viscosity and density values during injection of said $CO_2$ composition into the formation.

DETAILED DESCRIPTION OF THE INVENTION

A "site of injection", within the context of the present invention, shall be understood as being a position adjacent an opening of an injection port, through which opening $CO_2$ is injected into an aquifer; said position being outside an outer surface of said conduit or well. The expression at the "site of injection", in some embodiments, can be understood to mean "at reservoir conditions". These expressions are used synonymously.

The present invention relates to methods for storing $CO_2$ in subterranean geological formations.

The $CO_2$ injected is a $CO_2$ composition compressed to assume a supercritical state at the site of injection, i.e., at reservoir conditions. The compressed gas may include $CO_2$ and additional compounds, which compounds preferably amount to less than 50% wt, 40% wt, 30% wt, 20% wt, 10% wt, 5% wt, 2% wt, most preferably to less than 1% wt, based on total compressed gas weight. The term "$CO_2$", according to the invention, and depending on the context, may relate to the above described mixtures of $CO_2$ and other components. The $CO_2$ injected is preferably not mixed with liquids, such as water or an aqueous solution, prior to injection. The $CO_2$ thus preferably does not contain liquid components.

The invention shall now be explained with reference to the appended figures.

Figure 1:
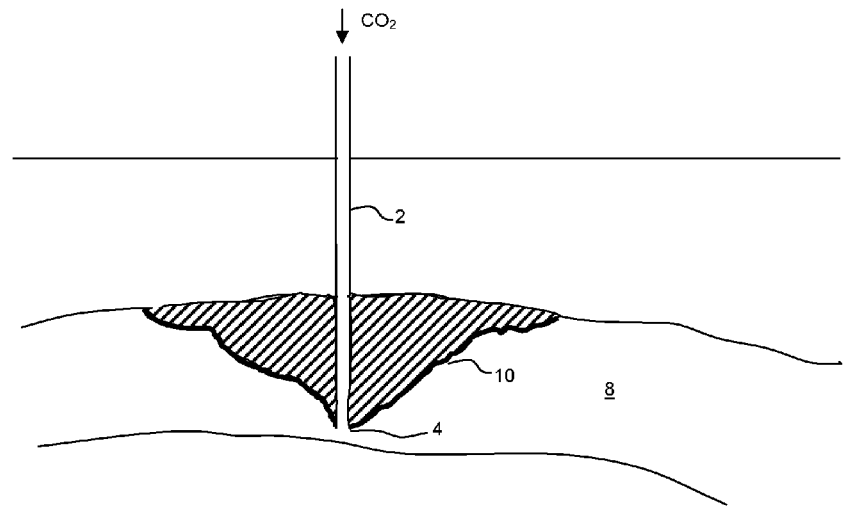
FIG. 1 shows a schematic representation of an injection front formed by conventional $CO_2$ injection.

FIG. 1 generally shows a conventional arrangement for introducing $CO_2$ into a subterranean formation. A conduit 2 is provided to transport $CO_2$ from a level substantially above surface into a reservoir 8 provided by the formation. The conduit 2 may be in form of a tube disposed within the casing of a well. Alternatively, the casing of the well itself may constitute the conduit 2. The conduit 2 terminates within the reservoir in an injection port 4. $CO_2$ is injected via the conduit 2 into the reservoir 8 under controlled pressure and temperature and is a supercritical fluid at the injection port 4 with a gas-like viscosity. The injection front formed when injecting $CO_2$ under these conditions is illustrated by the line 10 and the injected $CO_2$ is represented by the shaded area. As can be seen from FIG. 1, the gas-like $CO_2$ tends to migrate upwards, leaving the lower areas of the storage reservoir empty. It will be apparent that the same problem arises when the injection conditions result in a denser $CO_2$ composition, except that in this case the lower areas of the geological formation will be filled first, leaving the upper areas of the formation substantially empty.

Figure 2:
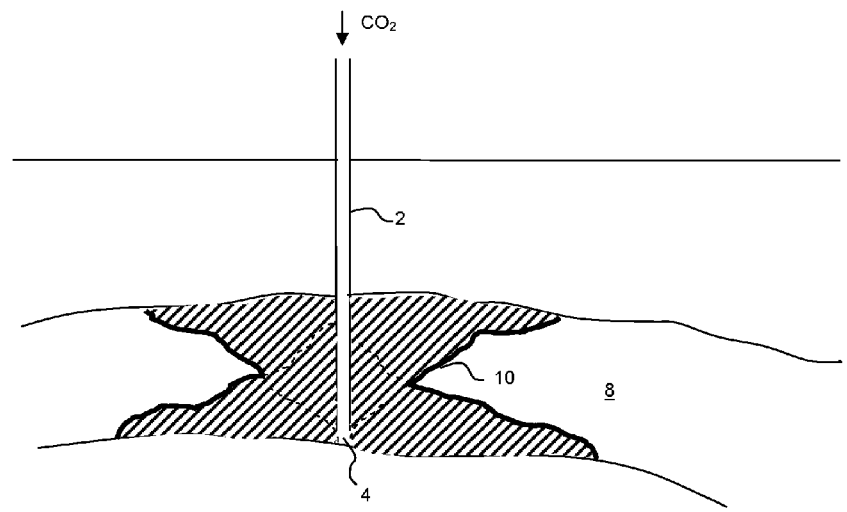
FIG. 2 shows a schematic representation of an injection front formed in accordance with the present invention.

FIG. 2 shows a simulation of the injection of a $CO_2$ composition according to the present invention, namely that the density and viscosity of the injected $CO_2$ composition is varied during injection. In this figure, the conduit 2, port 4 and formation structure 8 are assumed to be the same as that shown in FIG. 1. In this case, however, the characteristics of injected $CO_2$ composition are switched once, or periodically during injection to give it a higher viscosity and higher density, which makes it behave more like a liquid. During injection of the higher density (liquid-like) $CO_2$ composition, the injected stream tends to occupy the lower areas of the geological storage formation 8. The resulting injection front 10 is more uniform, and the storage capacity of the geological formation 8 increased. While this simulation illustrates the $CO_2$ composition injected under only two different sets of conditions to result in two different supercritical phases, it will be understood that more than two sets of conditions may be used to alter the viscosity and density still further.

Figure 3A:
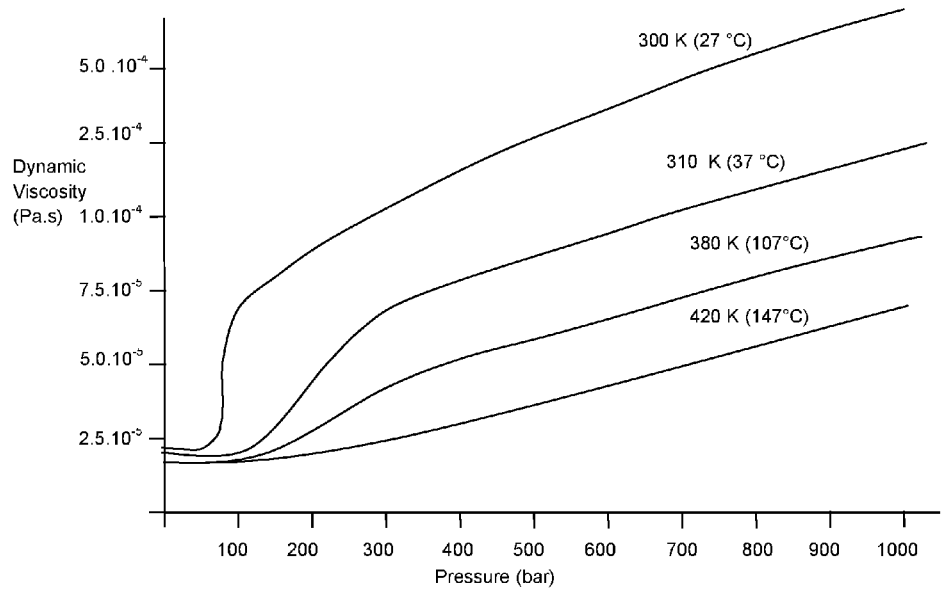
FIG. 3a illustrates the relationship between pressure and dynamic viscosity of pure $CO_2$ at different temperatures, FIG. 3b illustrations the relationship between pressure and specific density of pure $CO_2$ at different temperatures.

Turning now to FIGS. 3 and 4 it will be described how, in practice, this velocity and density change is achieved in accordance with a first and second embodiment of the present invention. FIG. 3a shows a representation of the relationship between the dynamic viscosity of pure $CO_2$ and pressure for different temperatures. The graph is restricted to show this relationship above the critical point (304.1K or 28.25° C. and 73.8 bar), where $CO_2$ is a supercritical fluid, as this represents the conditions in a subterranean storage reservoir. As can be seen from this graph, the line representing temperature at 310 K, which is the closest line above the critical point (304.1 K, 28.25° C.) and hence the first line to represent supercritical behaviour, shows a large change in viscosity at lower pressures after which the relationship is substantially linear. As the temperature increases, the relationship tends more to a linear one at lower pressures also. The isotherms indicate that a similar relationship exists between viscosity and temperature at constant pressure.

Figure 3B:
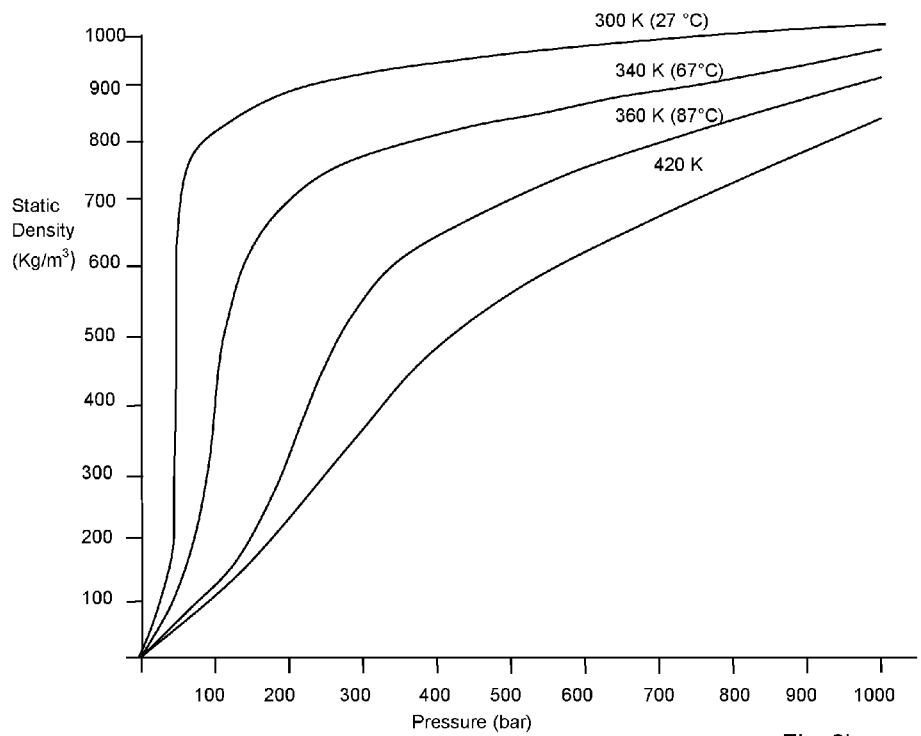

FIG. 3b shows a representation of the relationship between static density and pressure of pure $CO_2$ for different temperatures. Once again this graph is restricted to showing supercritical conditions. In FIG. 3b it is evident that at temperatures and pressures close to the critical point a small change in pressure results in a large change in density. At higher temperatures and pressures, the relationship between density and pressure is substantially linear. It can further be deduced from the isotherms that a similar relationship exists between temperature and density.

The relationships illustrated in FIGS. 3a and 3b illustrate that a desired change in viscosity or density can be achieved by altering one or both of the injection pressure or injection temperature of a $CO_2$ composition. In the context of the present invention, the "injection pressure" is used to indicate the pressure of the $CO_2$ composition at the point of injection from the conduit or well into the geological storage formation. Similarly, the "injection temperature" is used to indicate the temperature of the $CO_2$ composition at the point of injection from the conduit or well into the geological storage formation. Thus any modification of temperature or pressure effected upstream of the injection point would have to be made to achieve the desired swing in injection parameters at the point of injection. It will be recognized by those skilled in the art that the temperature or pressure swing required to achieve the desired shift in viscosity and density depends on the prevailing pressure and temperature in the storage reservoir. For example, in a reservoir where the pressure and temperature are close to the critical point, such as in the Sleipner project, in which $CO_2$ is stored at a depth of between 800 and 1000, below sea level, a temperature reduction of 3° C. (at constant pressure) is sufficient to change the behaviour of the $CO_2$ composition from a gas to a liquid at the injection point. Similarly, a pressure increase (at constant temperature) of 7 bar will change the flow characteristics of the injected $CO_2$ stream from gas-like to a liquid-like. In reservoirs where the pressure and temperatures are well above the critical point of the injected $CO_2$ composition, such as in the Snøhvit project located in the Barents Sea offshore Norway at a depth of 2600 m below sea level, a temperature increase of 47° C. or pressure increase of 73 bar is necessary to effect the same change in flow behaviour from gas-like to liquid-like.

Again, since the viscosity and density of the $CO_2$ composition depends on the reservoir conditions, namely the prevailing temperature and pressure, the shift in viscosity and density at the two or more different injection parameters will depend on the real reservoir conditions. One example of a possible shift in viscosity for a geological storage site at a temperature of 80° C. would be between values of around 0.00446 cP and around 0.00539 cP. For the same geological formation, a change in density between around 551 kg/m3 and around 732 kg/m3 would be possible. Clearly the larger the difference between the viscosity and density values, the more the flow behaviour of the injected fluid will vary. The most appropriate values for any specific $CO_2$ sequestration plant will depend on the particular characteristics of the storage reservoir.

It should be understood that the injected stream is always a supercritical fluid and thus exists in a phase between liquid and gas. It cannot actually become a liquid or a gas, yet it can demonstrate more gas-like or more liquid-like properties i.e. occupy a different supercritical "phase" by virtue of its viscosity and density.

Figure 4A:
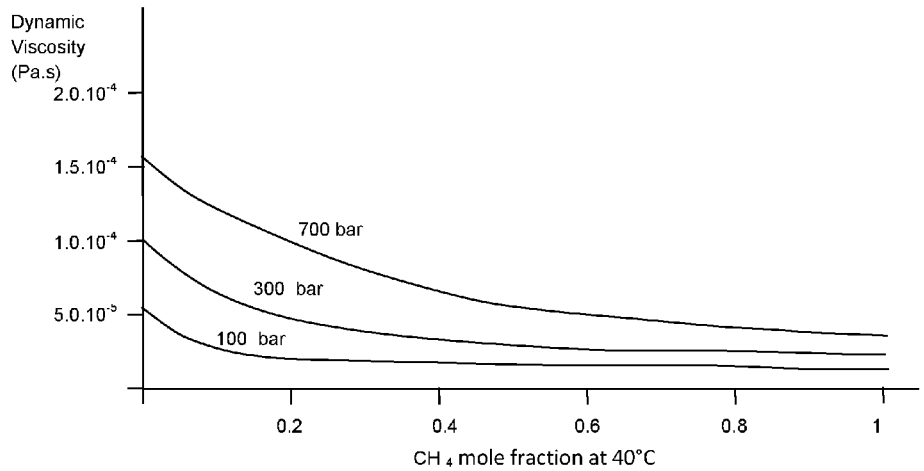
FIG. 4a illustrates the relationship between the dynamic viscosity and mole fraction of methane in a binary mixture of $CO_2$ and $CH_4$ at different pressures.
Figure 4B:
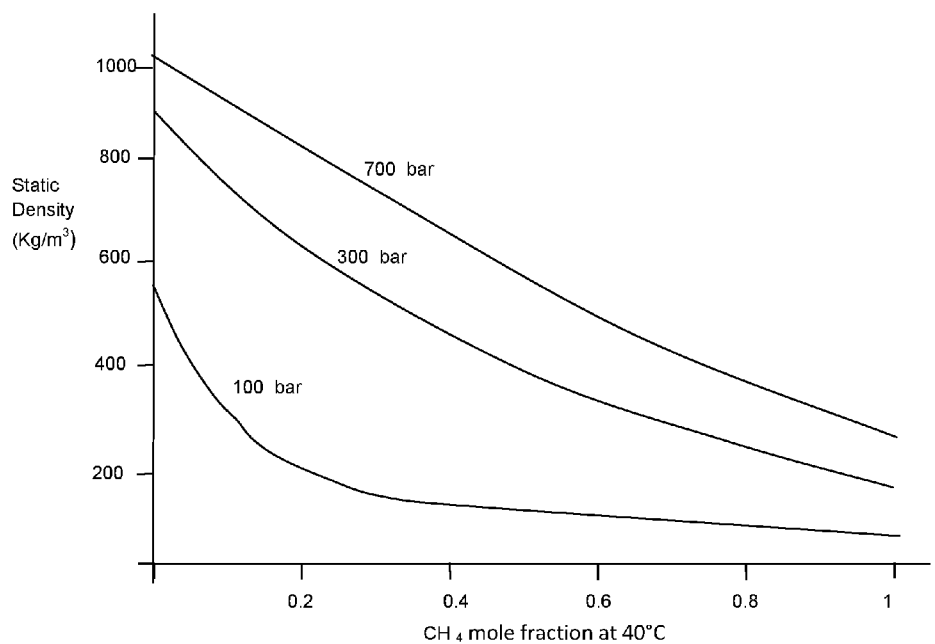
FIG. 4b illustrates the relationship between the specific density and mole fraction of methane in a binary mixture of $CO_2$ and $CH_4$ at different pressures

In addition to modifying the temperature and/or the pressure of the injected $CO_2$ composition, a third embodiment of the present invention relates to the change in viscosity and/or density of an injected $CO_2$ composition by purposefully enriching it with hydrocarbons, specifically with alkanes. Of most interest in the context of the present invention are the lower alkanes, for example, methane, ethane propane and butane, or a mixture of these. Each of these lower alkanes have different densities and viscosities, hence the resultant $CO_2$ composition will have a different viscosity and density depending on the type and concentration of the respective lower alkane. An example of the effect of adding methane to pure $CO_2$ is illustrated in FIGS. 4a and 4b. FIG. 4a shows a graph of the relationship between dynamic viscosity and concentration of methane in a binary mixture of methane and $CO_2$ at 40° C. for different pressures. FIG. 4b shows a graph of the relationship between static density and concentration of methane in a binary mixture of methane and $CO_2$ at 40° C. for different pressures. As can be seen from FIG. 4a, for a fixed pressure, the level of viscosity falls with the concentration of methane. Likewise from FIG. 4b it is evident that density also falls with increased methane content. However, in both cases the greatest rate of change is evident at molar fractions below about 0.2. Altering the composition of the $CO_2$ composition has the effect of changing the critical temperature and pressure of the $CO_2$ composition. Clearly the effect of adding one or more of the lower alkanes listed above will depend on the alkane added. This is illustrated in the following table that gives the critical temperature and pressure for different binary mixtures of $CO_2$ and a lower alkane.

| $CO_2$ | Alkane | Critical pressure | Critical temperature |
|---|---|---|---|
| 100 mol % $CO_2$ | — | 73.8 bar | 28.25° C. |
| 97 mol % $CO_2$ | 3 mol % n-butane | 72.27 bar | 32.78° C. |
| 98 mol % $CO_2$ | 2 mol % C6 alkane | 76.23 bar | 36.64° C. |
| 97 mol % $CO_2$ | 3 mol % ethane | 77.65 bar | 26.29° C. |
| 97 mol % $CO_2$ | 3 mol % propane | 4.58 bar | −59.37° C. |

Depending on the prevailing reservoir pressure and temperature, the viscosity and density of the mixture can be altered more or less simply by altering the composition. This is because the supercritical "phase" of this mixture, i.e. the propensity of the supercritical mixture to behave more like a gas or more like a liquid, depends on the position of the reservoir pressure and temperatures relative to the critical temperature and pressure.

Since methane, ethane, propane and butane may all be present in $CO_2$ produced during natural gas production, the concentration of one or more of these alkanes may be increased or decreased periodically preferably at the processing plant but possibly also at or close to the well-head to obtain the desired change in viscosity and density at the injection site.

While each of the parameters of injection temperature, injection pressure and hydrocarbon content has been discussed separately above, it will be understood that the parameter swing effected during injection can include a change in two or even all of these parameters in order to obtain the desired change in viscosity and density of the injected $CO_2$ composition.

Figure 5:
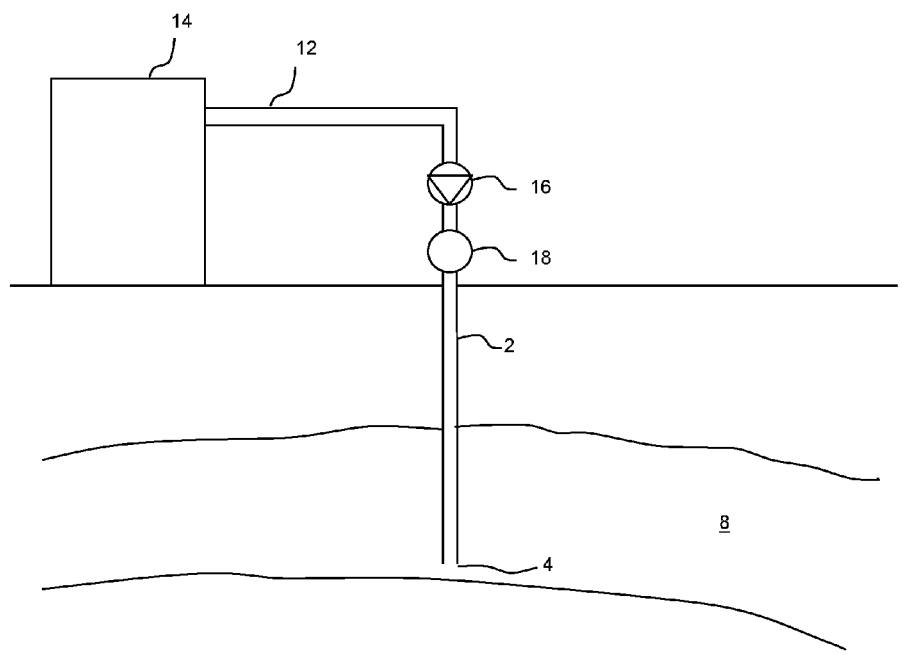
FIG. 5 shows an arrangement according to the invention.

An arrangement suitable for performing the required switching of injection parameters is illustrated schematically in FIG. 5. This arrangement comprises a conduit 2, which once again may be in the form of a tube disposed within the casing of a well, or alternatively be constituted by the well casing itself. In the illustrated embodiment, the well is a vertical well, however, it will be understood by those skilled in the art that it could alternatively be an inclined or deviated well or have a substantially vertical, or inclined upper (proximal) portion and a substantially horizontal distal portion. The distal end of the conduit 2 terminates within the reservoir 8 in an injection port 4. The well conduit 2 is connected via pipeline 12 to a processing plant 14. This may be a natural gas processing plant, which produces $CO_2$ as a waste product. At the well-head there is provided a compressor and an additional parameter adjustment arrangement illustrated simply by the element 18. This latter element 18 may include a mixer for mixing fixed amounts of one or more lower alkanes, such as methane, ethane, propane and butane with the $CO_2$ to obtain a $CO_2$ composition with a defined alkane concentration. Alternatively, or additionally, the parameter adjustment arrangement 18 may include a heat exchanger or other arrangement for modifying the temperature of the $CO_2$ composition. The compressor 16 and parameter adjustment arrangement 18 are controlled to alter one or more of the parameters of pressure temperature and lower alkane content (i.e. concentration of methane, ethane, propane and/or butane) at least once, and preferably periodically throughout the injection of $CO_2$ into the well to obtain the desired injection parameters, i.e. the temperature, pressure and lower alkane concentration at the point of injection into the formation, i.e. at the exit of port 4. In the illustrated example, the parameter adjustment means are shown disposed on the well itself. It will be understood that these elements may be located at a distance from the wellhead, possibly even onshore when the $CO_2$ sequestration site is offshore. Alternatively, at least some of the injection parameters may be controlled and altered by suitable means present in processing plant 14. After separation from the natural gas, the $CO_2$ is conventionally compressed and dehydrated and then transported via pipeline 12 to the well-head. The $CO_2$ obtained in this way may be pure $CO_2$ or may alternatively contain specific levels of contaminants, including the lower alkanes, methane, ethane, propane and butane. It is possible to periodically alter the concentration of lower alkanes remaining in the $CO_2$ in order to obtain the required concentration in the $CO_2$ injected into the formation 8. Moreover, provided that the distance between the processing plant and the well-head is short enough to allow it, it is also possible to set and alter both the pressure and temperature of the $CO_2$ leaving the processing plant, e.g. using the existing compressor and a heat exchanger, to obtain the desired parameter variation at the point of injection.

Compositional simulation results performed on realistic models of CO2 storage sites indicate increase in CO2 storage capacity upon using the techniques described in this patent.

Storage capacity is expected to increase by 30% when the injection fluid is designed using the "Composition Swing Injection" technique.

Figure 6:
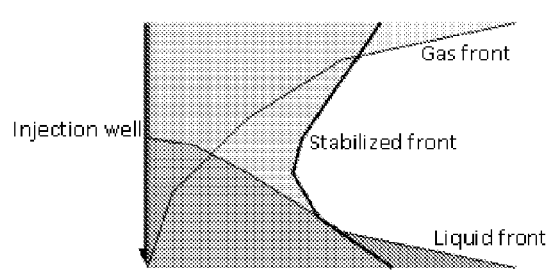
FIG. 6 shows the concept of "front stabilization".

According to the concept of "front stabilization" demonstrated in the sketch as shown in FIG. 6, the "Composition Swing Injection" technique stops CO2 fingering and segregation into the top of the storage site since a denser injection stream is injected alternatingly.

What is claimed is:

1. A method of introducing a $CO_2$ composition into a subterranean geological formation for storage of $CO_2$ therein, said method comprising the steps of:
    injecting a volume of said $CO_2$ composition into said formation using a first set of injection parameters at which said $CO_2$ composition is a supercritical fluid having first viscosity and density values, storing the volume of said $CO_2$ composition injected using the first set of injection parameters in the subterranean geological formation,
    modifying said injection parameters such that a volume of said $CO_2$ composition is injected into said formation using at least one second set of injection parameters at which said $CO_2$ composition is a supercritical fluid having second viscosity and density values that are different from said first viscosity and density values, storing the volume of said $CO_2$ composition injected using the at least one second set of injection parameters in the subterranean geological formation,
    wherein said injection parameters include the injection temperature, injection pressure and hydrocarbon content of said $CO_2$ composition, wherein the method includes a step of alternating cyclically between said first and second set of injection parameters.

2. A method as claimed in claim 1, wherein the period of time in which said $CO_2$ composition is injected into said formation under said first set of injection parameters is substantially equal to the period of time in which said $CO_2$ composition is injected into said formation under said second set of injection parameters.

3. A method as claimed in claim 1, wherein the period of time in which said $CO_2$ composition is injected into said formation under said first set of injection parameters is longer or shorter than the period of time in which said $CO_2$ composition is injected into said formation under said second set of injection parameters.

4. A method as claimed in claim 1, wherein said first and second injection parameters differ from one another in injection temperature of said $CO_2$ composition.

5. A method as claimed in claim 1, wherein said first and second injection parameters differ from one another in injection pressure of said $CO_2$ composition.

6. A method as claimed in claim 1, wherein said first and second injection parameters differ from one another by the hydrocarbon content of said composition.

7. A method as claimed in claim 6, wherein said hydrocarbon content is made up of one or more alkanes.

8. A method as claimed in claim 6, wherein said hydrocarbon content is made up of one or more of methane, ethane, propane and butane.

9. A method as claimed in claim 6, wherein the hydrocarbon content in said $CO_2$ composition is in the range of 0 mol % hydrocarbon to 10 mol % hydrocarbon.

\* \* \* \* \*